(12) United States Patent
Tang et al.

(10) Patent No.: US 11,563,500 B2
(45) Date of Patent: Jan. 24, 2023

(54) METHOD FOR ELECTROMAGNETIC INTERFERENCE CONTROL AND RELATED DEVICES

(71) Applicant: GUANGDONG OPPO MOBILE TELECOMMUNICATIONS CORP., LTD., Guangdong (CN)

(72) Inventors: Kai Tang, Guangdong (CN); Zhengpeng Tan, Guangdong (CN); Yun Chen, Guangdong (CN); Lizhong Wang, Guangdong (CN); Hai Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 115 days.

(21) Appl. No.: 17/319,008

(22) Filed: May 12, 2021

(65) Prior Publication Data

US 2021/0266077 A1  Aug. 26, 2021

Related U.S. Application Data

(63) Continuation of application No. PCT/CN2019/109453, filed on Sep. 30, 2019.

(30) Foreign Application Priority Data

Nov. 13, 2018  (CN) .......................... 201811355963.8

(51) Int. Cl.
*H04B 15/02* (2006.01)
*H04M 1/72412* (2021.01)
(Continued)

(52) U.S. Cl.
CPC ........... *H04B 15/02* (2013.01); *H04B 1/3827* (2013.01); *H04M 1/72412* (2021.01); *H04N 7/18* (2013.01); *H04W 84/12* (2013.01)

(58) Field of Classification Search
CPC combination set(s) only.
See application file for complete search history.

(56) References Cited

U.S. PATENT DOCUMENTS

| 10,356,401 | B1 * | 7/2019 | Zhang | H04N 21/41407 |
| 10,657,928 | B2 * | 5/2020 | Kim | G03B 21/00 |
| 2009/0036158 | A1 * | 2/2009 | Fujinawa | H04N 9/3185 |
| | | | | 455/556.1 |

(Continued)

FOREIGN PATENT DOCUMENTS

| CN | 1118206 | 3/1996 |
| CN | 1416110 | 5/2003 |

(Continued)

OTHER PUBLICATIONS

SIPO, First Office Action for CN Application No. 201811355963.8, dated Jun. 3, 2020.

(Continued)

*Primary Examiner* — Cindy Trandai
(74) *Attorney, Agent, or Firm* — Hodgson Russ LLP (57) ABSTRACT

A method for electromagnetic interference control and related devices are provided. The method includes the following. Electromagnetic interference between a Wi-Fi module and a MIPI of a display of the electronic device is detected in response to detecting a request for screen-projection to a target screen-projection device. In response to the detected electromagnetic interference, the display is turned off, and screen-projection to the target screen-projection device is performed, where the first prompt message indicates that the electronic device is turning off the display and performing screen-projection to the target screen-projection device.

18 Claims, 6 Drawing Sheets

(51) Int. Cl.
    *H04B 1/3827*     (2015.01)
    *H04N 7/18*     (2006.01)
    *H04W 84/12*     (2009.01)

(56) References Cited

U.S. PATENT DOCUMENTS

| | | | |
|---|---|---|---|
| 2011/0090192 A1* | 4/2011 | Harris | G03B 21/56 |
| | | | 345/207 |
| 2012/0127133 A1 | 5/2012 | Frank | |
| 2013/0107779 A1 | 5/2013 | Kawakita et al. | |
| 2017/0118759 A1* | 4/2017 | Choi | H04W 72/0453 |
| 2017/0171367 A1* | 6/2017 | Liu | H04M 1/0202 |
| 2017/0234691 A1 | 8/2017 | Abramson et al. | |
| 2017/0279949 A1 | 9/2017 | Takahashi | |
| 2018/0212689 A1* | 7/2018 | Di | G09G 3/36 |
| 2019/0050188 A1* | 2/2019 | Park | G06F 1/06 |
| 2019/0246161 A1* | 8/2019 | Lim | H04N 21/4728 |
| 2020/0183525 A1* | 6/2020 | Liu | G06F 3/0416 |

FOREIGN PATENT DOCUMENTS

| | | |
|---|---|---|
| CN | 103000015 | 3/2013 |
| CN | 103442144 | 12/2013 |
| CN | 105306682 | 2/2016 |
| CN | 105827775 | 8/2016 |
| CN | 105871477 | 8/2016 |
| CN | 106162017 | 11/2016 |
| CN | 106936515 | 7/2017 |
| CN | 108063646 | 5/2018 |
| CN | 108601037 | 9/2018 |

OTHER PUBLICATIONS

SIPO, Notification to Grant Patent Right for Invention for CN Application No. 201811355963.8, dated Sep. 18, 2020.
WIPO, International Search Report and Written Opinion for PCT/CN2019/109453, dated Dec. 27, 2019.

* cited by examiner

METHOD FOR ELECTROMAGNETIC INTERFERENCE CONTROL AND RELATED DEVICES

CROSS-REFERENCE TO RELATED APPLICATIONS

This application is a continuation of International Application No. PCT/CN2019/109453, filed on Sep. 30, 2019, which claims priority to Chinese Patent Application No. 201811355963.8, filed on Nov. 13, 2018, the entire disclosures of which are incorporated herein by reference.

TECHNICAL FIELD

This disclosure relates to the technical filed of electronic devices, and particularly to a method for electromagnetic interference control and related devices

BACKGROUND

With the development of mobile communication technology, users have an increasing demand for communication with electronic devices such as mobile phones. Currently, the electronic device on the market generally transmits data through a cellular mobile network or a wireless fidelity (Wi-Fi) network, and full-screen mobile phones are facing radio frequency interference problems. Specifically, a driver-integrated chip of a display has extended to an antenna clearance area, and a frequency division point and/or a frequency multiplication point of a frequency of a mobile industry processor interface (MIPI) of the display has an interference to a radio frequency antenna, which leads to low receiving sensitivity (i.e., total isotropic sensitivity (TIS)) of the antenna.

SUMMARY

Disclosed herein are implementations of a method for electromagnetic interference control and related devices.

According to a first aspect, implementations provide a method for electromagnetic interference control. The method for electromagnetic interference control is implemented in an electronic device and includes the following.

Electromagnetic interference between a Wi-Fi module of the electronic device and a mobile industry processor interface (MIPI) of a display of the electronic device is detected in response to detecting a request for screen-projection to a target screen-projection device. In response to the detected electromagnetic interference, a first prompt message is output, the display is turned off, and screen-projection to the target screen-projection device is performed, where the first prompt message indicates that the electronic device is turning off the display and performing screen-projection to the target screen-projection device.

According to a second aspect, implementations provide a device for electromagnetic interference control. The device includes a communication unit and a processing unit. The processing unit is configured to: activate a Wi-Fi module in response to detecting a request for screen-projection to a target screen-projection device; search for and access a target wireless network, the target screen-projection device being connected to the target wireless network; detect electromagnetic interference between the Wi-Fi module and a MIPI of a display of the electronic device; output a first prompt message, turn off the display, and perform screen-projection to the target screen-projection device, in response to the detected electromagnetic interference, where the first prompt message indicates that the electronic device is turning off the display and performing screen-projection to the target screen-projection device.

According to a third aspect, implementations provide an electronic device. The electronic device includes a processor, a memory, a communication interface, and one or more programs stored in the memory. The one or more programs are configured to be executed by the processor and include instructions configured to perform operations of the method in the first aspect.

According to a fourth aspect, implementations provide a non-transitory computer-readable storage medium. The non-transitory computer-readable storage medium is configured to store a computer program for electronic data interchange. The computer program causes a computer to execute all or part of operations of the method in the first aspect.

According to a fifth aspect, implementations provide a computer program product. The computer program product includes a non-transitory computer-readable storage medium storing a computer program. The computer program is operable to cause the computer execute all or part of operations of the method in the first aspect. The computer program product may be a software installation package.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic devices involved in the implementations of the present application may be electronic devices with data transmission capabilities. The electronic device may include various handheld devices, in-vehicle devices, wearable devices, computing devices that have wireless communication functions or other processing devices connected to the wireless modem, as well as various forms of user equipment (UE), mobile stations (MS), terminal devices, and the like. Hereinafter, the implementations of the disclosure will be interpreted with reference to the accompanying drawings.

Figure 1:
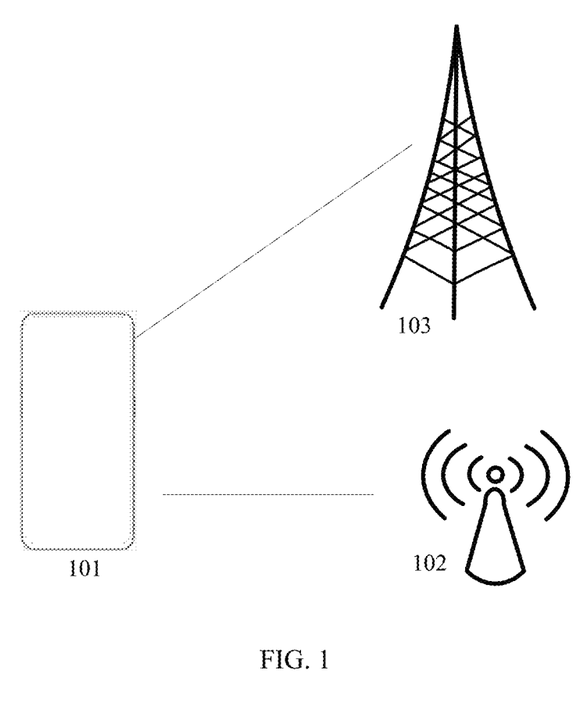
FIG. 1 is a schematic architecture diagram illustrating a local area network wireless communication system according to implementations.

As illustrated in FIG. 1, currently, an electronic device 101 can be connected with a base station 103 and/or a wireless hotspot device 102. When the electronic device 101 is connected with the base station 103, a voice call service such as a voice call service in long term evolution (LTE) can be achieved through a mobile communication network. When the device 101 is connected with the wireless hotspot device 102, a voice call service such as an IP multimedia subsystem (IMS) voice call service can be achieved through a wireless local area network (WLAN).

Figure 2:
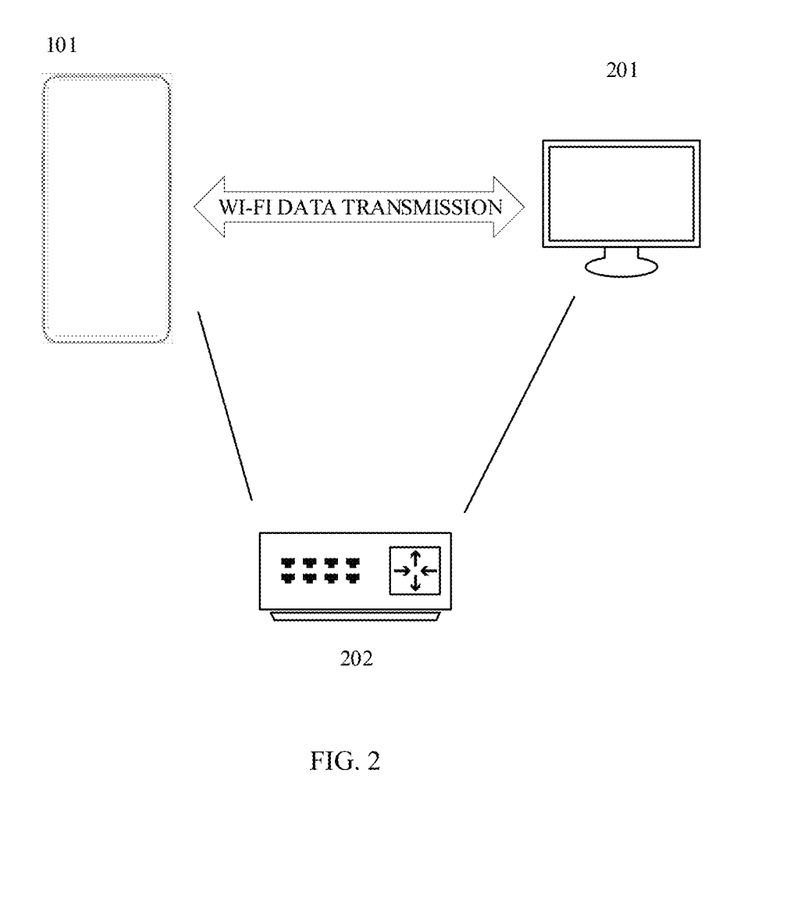
FIG. 2 is a schematic architecture diagram illustrating a local area network wireless communication system according to other implementations.

There are four mature solutions that support a screen-projection function of the electronic device 101 and wireless display technology, that is: Airplay, Miracast, wireless display (WiDi), and digital living network alliance (DLNA). Screen-projection of an electronic device can be realized based on DLNA. DLNA aims at "enjoy your music, photos and videos, anywhere anytime". DLNA is initiated and established by Sony™, Intel™, Microsoft™ and the like, to realize interconnection between a wireless network and a wired network involving personal PCs, consumer appliances, mobile devices, and the like, thereby making unlimited sharing and growth of digital media and content services possible. DLNA standard includes a number of protocols and standards, the most important part of which is UPnP. In practical applications, as illustrated in FIG. 2, it is necessary to ensure that both the electronic device 101 and the screen-projection device 201 are connected to a Wi-Fi network of a same router 202. A DLNA function of the screen-projection device 201 is enabled. After a video player or other software that supports the DLNA function in the electronic device are launched, once the screen-projection device is searched and connected successfully, screen-projection can be conducted.

Figure 3:
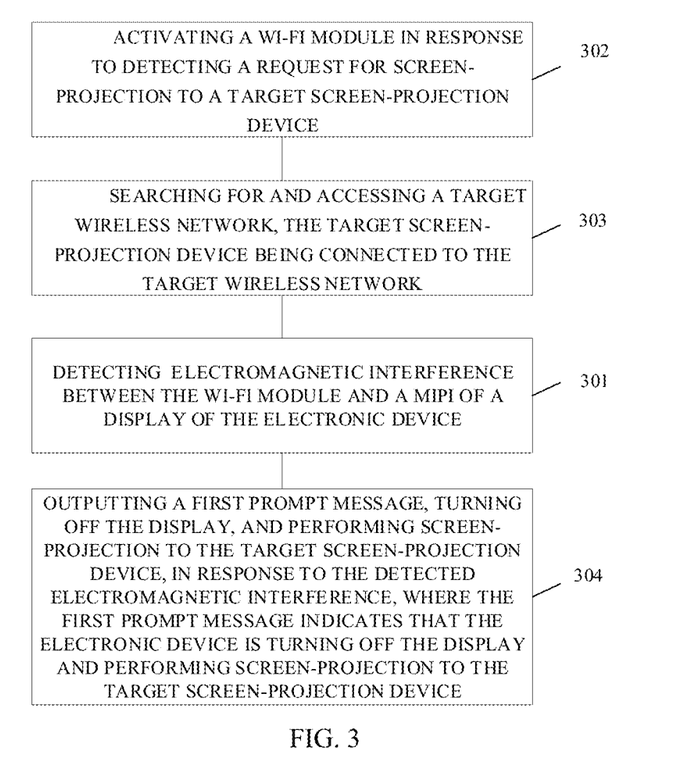
FIG. 3 is a schematic flow chart illustrating a method for electromagnetic interference control according to implementations.

FIG. 3 is a schematic flow chart illustrating a method for electromagnetic interference control according to implementations. As illustrated in FIG. 3, the method for electromagnetic interference control begins at block 301.

At block 301, the electronic device detects whether there is electromagnetic interference between a Wi-Fi module of the electronic device and a MIPI of a display of the electronic device, in response to detecting a request for screen-projection to a target screen-projection device.

According to capabilities of chips, the MIPI of the display can support different frequencies or frequency bands, such as 514.5 MHz, 512.5 MHz. The Wi-Fi module has different channels, different channels correspond to different operating frequencies of the Wi-Fi module, and different operating frequencies cause different interferences to the frequency of the MIPI of the display.

As an implementation, the method further includes operations at block 302 and block 303 before the electronic device detects whether there is electromagnetic interference between the Wi-Fi module and the MIPI.

At block 302, in response to detecting the request for screen-projection to a target screen-projection device, an electronic device activates a Wi-Fi module.

As a specific implementation, the electronic device can activate the Wi-Fi module upon detecting the request for screen-projection to the target screen-projection device; alternatively, the electronic device can also activate the Wi-Fi module upon detecting a request for screen-projection to any screen-projection device.

At block 303, the electronic device searches for and accesses a target wireless network, where the target screen-projection device is connected to the target wireless network.

When the electronic device communicates with a wireless hotspot, a router will select different communication channels for data transmission. Each communication channel corresponds to frequency-domain resources specified in protocols, such as a global system for mobile communication (GSM) frequency band, an LTE B8/B20/B28 frequency bands etc. As known from communication protocols, in the process of handling different services, the electronic device can use one or more different communication channels in a same service-processing period.

At block 304, in response to detecting that there is electromagnetic interference, the electronic device turns off the display, and performs screen-projection to the target screen-projection device.

As an implementation, in response to detecting that there is electromagnetic interference, the electronic device can further output a first prompt message, where the first prompt message indicates that the electronic device is turning off the display and performing screen-projection to the target screen-projection device.

When the electronic device detects electromagnetic interference, the first prompt message is output to prompt the user that the electronic device is to turn off a screen and perform screen-projection in the background, so as to avoid the display is turned off so suddenly. At the same time, the electronic device turns off the screen and performs screen-projection in response to detecting that there is interference, which can avoid screen-projection failure caused by interference between the display and the Wi-Fi module.

According to the implementations, in response to detecting the request for screen-projection to the target screen-projection device, the electronic device activates the Wi-Fi module. The electronic device searches for and accesses the target wireless network, where the target screen-projection device is connected to the target wireless network. The electronic device detects whether there is electromagnetic interference between the Wi-Fi module and the MIPI of the display of the electronic device. When there is electromagnetic interference, the electronic device outputs the first prompt message, turns off the display, and performs screen-projection to the target screen-projection device, where the first prompt message is used to indicate that the electronic device is turning off the display and performing screen-projection to the target screen-projection device. As can be seen, in response to detecting the request for screen-projection and there is electromagnetic interference between the Wi-Fi module and the MIPI of the display, the electronic device turns off the display, and performs screen-projection in the background, thereby avoiding electromagnetic interference between the Wi-Fi module and the MIPI of the display which affects a success rate of screen-projection, and improving communication stability in a screen-projection scene.

As an implementation, whether there is electromagnetic interference between the Wi-Fi module and the MIPI of the display of the electronic device is detected as follows.

At least one detection value of a first frequency and a detection value of a second frequency are obtained, where the first frequency is a communication frequency of the Wi-Fi module and the second frequency is an operating frequency of the MIPI. Whether there is electromagnetic interference between the Wi-Fi module and the MIPI is determined according to an interference channel list set in advance, where the interference channel list contains information of interference of different operating frequencies of the MIPI to different channels. The communication frequency of the Wi-Fi module is frequency in which the Wi-Fi module communicates with the target router through a channel that is currently used by the target router.

The interference channel list contains interference values and interference levels of interference of different operating frequencies of the MIPI to different Wi-Fi channels of the target router. According to the interference channel list, the detection value of the second frequency, and the at least one detection value of the first frequency in the interference channel, determine whether there is a detection value of the first frequency in the interference channel causing interface with respect to the detection value of the second frequency. If there is a detection value of the first frequency that causes interference to the detection value of the second frequency, determine that there is electromagnetic interference; if there is no detection value of the first frequency that causes interference to the detection value of the second frequency, determine that there is no electromagnetic interference. Wireless routers generally have channels 1~13. Table 1 only lists some channels, the frequency of the MIPI is a temporarily defined frequency, which will be adjusted according to actual situations in a specific implementation.

TABLE 1

| frequency of the MIPI | channel of WI-FI module | | | | | | |
| --- | --- | --- | --- | --- | --- | --- | --- |
| | Channel 1 | Channel 2 | Channel 3 | Channel 4 | Channel 5 | Channel 6 | Channel 7 |
| | interference | | | | | | |
| 512.5M | 2db | 4db | 3~4db | 6db | 5db | 0db | 5db |
| 514.5M | 2db | 3~4db | 2db | 4db | 3db | 1db | 4db |
| 516.5M | 3db | 5db | 3db | 4db | 5db | 2db | 4db |

For example, as illustrated in Table 1, when the electronic device uses channel 6 and the detection value of the second frequency (i.e., the frequency of the MIPI) is 514.5M, according to Table 1, the interference value is 1 db, and the frequency of the MIPI can be adjusted to 512.5M to achieve the minimum interference. When the electronic device uses channel 5 and the detection value of the second frequency (i.e., the frequency of the MIPI) is 512.5M, and a channel of the electronic device can be switched from channel 5 to channel 6 to achieve the minimal interference. When the electronic device uses channel 5 and the detection value of the second frequency (i.e., the frequency of the MIPI) is 514.5M, according to Table 1, the interference value is 3 db, and to achieve the minimal interference, the frequency of the MIPI can be adjusted to 512.5M and the channel of the electronic device can be switched from channel 5 to channel 6.

For example, the electronic device can obtain the at least one detection value of the first frequency and the detection value of the second frequency as follows. The electronic device controls the Wi-Fi module to detect frequency information and report all channel information to an application processor (AP). The electronic device controls the AP to receive all channel information and obtain the detection value of the second frequency. The AP determines whether there is electromagnetic interference based on the frequency of the MIPI of the display detected locally. Due to strong processing capabilities, a detection result can be obtained quickly and efficiently. For another example, the electronic device can also control a baseband processor (BP) to obtain the at least one detection value of the first frequency and receive the detection value of the second frequency from the AP through a channel. The electronic device can also control the AP to obtain the detection value of the second frequency and send the detection value of the second frequency to the BP. The BP detects whether there is electromagnetic interference in the electronic device according to the at least one detection value and the detection value of the second frequency. The AP and BP of the electronic device can complete detection of electromagnetic interference interactively. Specifically, BP collects the at least one detection value of the first frequency, the AP detects the frequency of the MIPI of the display and sends it to the BP. The BP determines whether there is electromagnetic interference based on the frequency of the MIPI of the display detected locally. Due to small data amount, low delay, and high real-time performance of transmission between the AP and the BP, electromagnetic interference can be detected efficiently.

It can be seen that in this implementation, the electronic device can quickly determine whether a frequency currently used by the MIPI of the display causes electromagnetic interference to any of the detection values of the first frequency based on frequency comparison, so as to quickly determine an electromagnetic interference scene based on real-time detection value and detect electromagnetic interference comprehensively and accurately, thereby improving accuracy and comprehensiveness of interference detection.

As an implementation, the method further includes the following after the first prompt message is output and the display is turned off when there is electromagnetic interference.

An operating frequency set of at least one channel of a target router and an available frequency range or available frequency of the second frequency are obtained. A strategy for electromagnetic interference control is determined according to the interference channel list, the operating frequency set of at least one channel of the target router, and any one of the available frequency range or available frequency of the second frequency. When the display is activated, interference control is performed according to the strategy for electromagnetic interference control to reduce or avoid electromagnetic interference caused by the MIPI to the Wi-Fi module of the electronic device.

The target router corresponds to the target wireless network, in other words, the target wireless network is generated by the target router. The strategy for electromagnetic interference control can be determined according to an operating frequency and a frequency of the MIPI of the display that cause the minimum interference in the interference channel list, the operating frequency set, and any one of the available frequency range and the available frequency value.

As an implementation, the interference control strategy can also be set in advance.

It can be seen that, in this implementation, besides performing screen-projection after the display is turned off, the electronic device can also determine the strategy for electromagnetic interference control according to the obtained operating frequency set of the at least one channel of the Wi-Fi module and the available frequency range or the available frequency of the second frequency, and perform interference control in response to detecting that the display is activated. In this way, electromagnetic interference occurred after the display is activated can be avoided, and stability of information interaction of the electronic device can be improved.

As an implementation, the strategy for electromagnetic interference control includes the following. A target frequency of the second frequency is determined according to the interference channel list, where the target frequency is a frequency of the MIPI that causes the minimum interference to the operating frequency of the channel of the target router. The frequency of the MIPI is adjusted to the target frequency.

The frequency of the MIPI that causes the minimum interference to the operating frequency of the channel currently used by the Wi-Fi module is determined according to the interference channel list, and frequency-hopping is performed for the MIPI of the display.

Strategies for determining the target frequency of the MIPI of the display can be varied, which may depend on capabilities of display chips, which is not limited here.

It can be seen that, in this implementation, after the electronic device determines that there is electromagnetic interference, the electronic device determines the target frequency for frequency hopping according to interference information of a current channel of the router and the available frequency range or available frequency of the second frequency, and adjusts the frequency of the MIPI to the target frequency display when the display is turned on, which is convenient and efficient, and has low delay and high stability.

As an implementation, the strategy for electromagnetic interference control includes the following. A target channel is determined according to the interference channel list, where the target channel is one of at least one wireless channel of the target router that causes the minimum interference to the operating frequency of the MIPI before the display is turned off. Perform channel switching according to the target channel.

The target channel that causes the minimum interference to the operating frequency of the MIPI before the display is turned off is determined according to the interference channel list, and channel switch negotiation is conducted with the target router to avoid interference when the display is turned on (i.e., lit up).

As an implementation, a frequency of the target channel determined by the electronic device will have little or no electromagnetic interference to the frequency of the MIPI of the display.

It can be seen that, in this implementation, the electronic device determines the target wireless channel that causes the minimum interference to the frequency of the MIPI of the display according to the operating frequency of the at least one wireless channel and the frequency of the MIPI of the display, and wireless channel switching negotiation is conducted with the router. In this way, the electronic device can be avoided being interfered by the MIPI of the display, and the processing process is convenient and efficient, and of low delay and high stability.

As an implementation, the strategy for electromagnetic interference control includes the following. A target channel and a target frequency of the second frequency are determined according to the interference channel list, where the target channel and the target frequency are a wireless channel and a frequency of the MIPI that correspond to the minimum interference in the interference channel list. The frequency of the MIPI is adjusted to the target frequency and channel switching is performed according to the target channel.

The target channel and the frequency of the MIPI of the display that correspond to the minimum interference are determined according to the interference channel list, and when the display is activated, frequency hopping and channel switching negotiation with the router are performed at the same time to avoid interference.

It can be seen that, in this implementation, the electronic device determines the target wireless channel that causes the minimum interference to the frequency of the MIPI of the display according to the operating frequency of the at least one wireless channel and the frequency of the MIPI of the display, so as to perform frequency hopping and negotiation with the router for wireless channel switching. In this way, the electronic equipment can be avoided being interfered by the MIPI of the display, the processing process is convenient and efficient, and of low delay and high stability.

As an implementation, screen-projection to the target screen-projection device is performed by sending a source address of data information to the target screen-projection device, where the source address of data information is used for the target screen-projection device to establish a connection with a server at the source address.

In response to detecting interference, the electronic device outputs a prompt message, and turns off the display to avoid interference. When the electronic device performs screen-projection after the display is turned off, the electronic device sends the source address of the data information to the target screen-projection device, the target screen-projection device directly connects with server at the source address after receiving the source address and obtains the data information from the server at the source address. For example, a mobile phone uses a video application such as iQIYI™ to perform screen-projection to a TV that is connected to the same Wi-Fi network. In response to detecting interference, the electronic device outputs a message that is used to indicate that interference is detected and the display is to be turned off, and continues to be connected with the TV in the background of the electronic device. After the TV obtains a source address of a video, the TV no longer interacts with the mobile phone, and directly obtains video information from the serve at the source address of the video.

It can be seen that, when there is electromagnetic interference, screen-projection is performed after the display is turned off, which can improve communication stability of the electronic device during screen-projection and improve success rate of screen-projection.

As an implementation, when there is electromagnetic interference, after the first prompt message is output, the display is turned off, and screen-projection to the target screen-projection device is performed, the electronic device further outputs a second prompt message when screen-projection of the electronic device is finished, where the second prompt message is used to indicate that screen-projection is finished.

That screen-projection is finished includes successful screen-projection and failing screen-projection. When screen-projection is successful, a second message is output to indicate success of screen-projection; when screen-projection is failing, a prompt message is output to prompt the user to re-perform screen-projection. The second prompt message may be text message, ringing, vibration, etc., which is not uniquely limited here.

It can be seen that, in this implementation, the electronic device outputs a prompt message after screen-projection is finished, so as to avoid interference caused by lighting of the display when screen-projection is not completed, and to improve the success rate of screen-projection.

Figure 4:
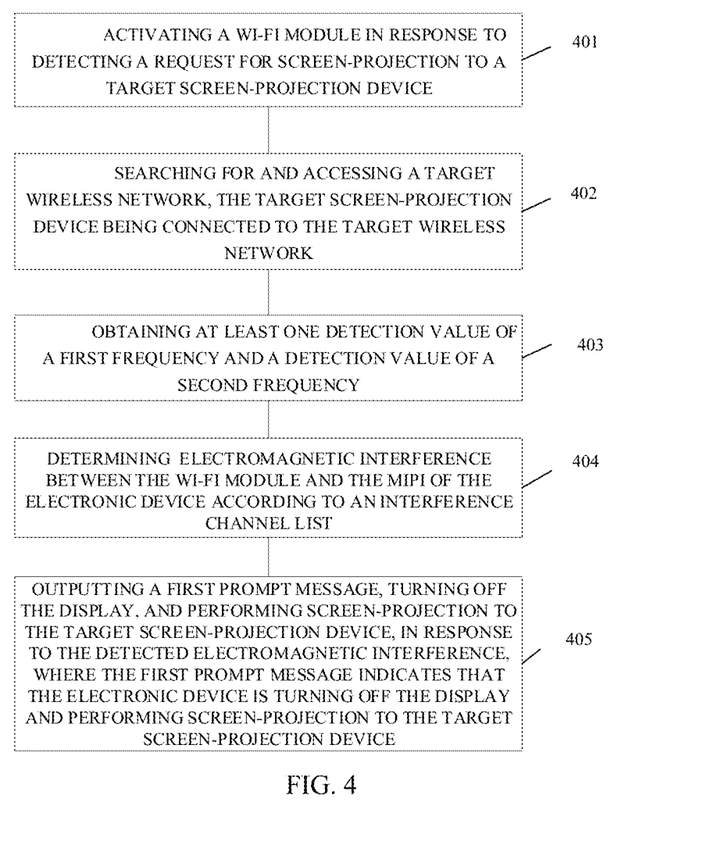
FIG. 4 is a schematic flow chart illustrating a method for electromagnetic interference control according to other implementations.

In accordance with the implementations of FIG. 3, FIG. 4 is a schematic flow chart illustrating a method for electromagnetic interference control according to other implementations. The method is applicable to the electronic device of FIG. 1 or FIG. 2. As illustrated in FIG. 4, the method begins at S401.

At block 401, in response to detecting a request for screen-projection to a target screen-projection device, an electronic device activates a Wi-Fi module.

At block 402, the electronic device searches for and accesses a target wireless network, where the target screen-projection device is connected to the target wireless network.

At block 403, the electronic device obtains at least one detection value of a first frequency and a detection value of a second frequency, where the first frequency is a communication frequency of the Wi-Fi module and the second frequency is an operating frequency of the MIPI.

At block 404, the electronic device determines whether there is electromagnetic interference between the Wi-Fi module and the MIPI of the electronic device according to an interference channel list, where the interference channel list contains information of interference of different operating frequencies of the MIPI to different channels.

At block 405, in response to detecting that there is electromagnetic interference, the electronic device outputs a first prompt message, turns off the display, and performs screen-projection to the target screen-projection device, where the first prompt message indicates that the electronic device is turning off the display and performing screen-projection to the target screen-projection device.

According to the implementations, in response to detecting the request for screen-projection to the target screen-projection device, the electronic device activates the Wi-Fi module. The electronic device searches for and accesses the target wireless network, where the target screen-projection device is connected to the target wireless network. The electronic device detects whether there is electromagnetic interference between the Wi-Fi module and the MIPI of the display of the electronic device. When there is electromagnetic interference, the electronic device outputs the first prompt message, turns off the display, and performs screen-projection to the target screen-projection device, where the first prompt message is used to indicate that the electronic device is turning off the display and performing screen-projection to the target screen-projection device. As can be seen, in response to detecting the request for screen-projection and there is electromagnetic interference between the Wi-Fi module and the MIPI of the display, the electronic device turns off the display, and performs screen-projection in the background, thereby avoiding electromagnetic interference between the Wi-Fi module and the MIPI of the display which affects a success rate of screen-projection, and improving communication stability in a screen-projection scene.

Additionally, the electronic device can quickly determine whether a frequency currently used by the MIPI of the display causes electromagnetic interference to any of the detection values of the first frequency based on frequency comparison, so as to quickly determine an electromagnetic interference scene based on real-time detection value and detect electromagnetic interference comprehensively and accurately, thereby improving accuracy and comprehensiveness of interference detection.

Figure 5:
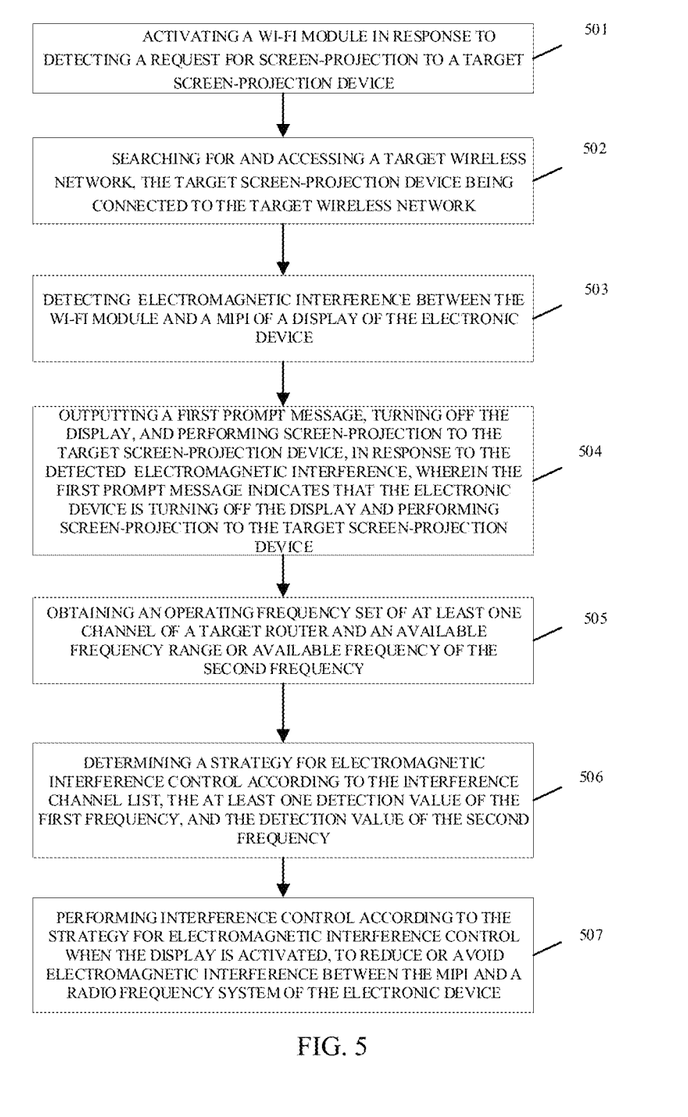
FIG. 5 is a schematic flow chart illustrating a method for electromagnetic interference control according to other implementations.

In accordance with the implementations of FIG. 3, FIG. 4 is a schematic flow chart illustrating a method for electromagnetic interference control according to other implementations. The method is applicable to the electronic device of FIG. 1 or FIG. 2. As illustrated in FIG. 5, the method begins at S501.

At block 501, in response to detecting a request for screen-projection to a target screen-projection device, an electronic device activates a Wi-Fi module.

At block 502, the electronic device searches for and accesses a target wireless network, where the target screen-projection device is connected to the target wireless network.

At block 503, the electronic device detects whether there is electromagnetic interference between the Wi-Fi module and a MIPI of a display of the electronic device.

At block 504, in response to detecting that there is electromagnetic interference, the electronic device outputs a first prompt message, turns off the display, and performs screen-projection to the target screen-projection device, where the first prompt message indicates that the electronic device is turning off the display and performing screen-projection to the target screen-projection device.

At block 505, the electronic device obtains an operating frequency set of at least one channel of a target router and an available frequency range or available frequency of the second frequency.

At block 506, the electronic device determines a strategy for electromagnetic interference control according to the interference channel list, the operating frequency set of at least one channel of the target router, and any one of the available frequency range or available frequency of the second frequency.

At block 507, the electronic device performs interference control according to the strategy for electromagnetic interference control when the display is activated, to reduce or avoid electromagnetic interference between the MIPI and the Wi-Fi module of the electronic device.

According to the implementations, in response to detecting the request for screen-projection to the target screen-projection device, the electronic device activates the Wi-Fi module. The electronic device searches for and accesses the target wireless network, where the target screen-projection device is connected to the target wireless network. The electronic device detects whether there is electromagnetic interference between the Wi-Fi module and the MIPI of the display of the electronic device. When there is electromagnetic interference, the electronic device outputs the first prompt message, turns off the display, and performs screen-projection to the target screen-projection device, where the first prompt message is used to indicate that the electronic device is turning off the display and performing screen-projection to the target screen-projection device. As can be seen, in response to detecting the request for screen-projection and there is electromagnetic interference between the Wi-Fi module and the MIPI of the display, the electronic device turns off the display, and performs screen-projection in the background, thereby avoiding electromagnetic interference between the Wi-Fi module and the MIPI of the display which affects a success rate of screen-projection, and improving communication stability in a screen-projection scene.

Additionally, besides performing screen-projection after the display is turned off, the electronic device can also determine the strategy for electromagnetic interference control according to the obtained operating frequency set of the at least one channel of the Wi-Fi module and any one of the available frequency range and the available frequency of the second frequency, and perform interference control in response to detecting that the display is activated. In this way, electromagnetic interference occurred after the display is activated can be avoided, and stability of information interaction of the electronic device can be improved.

Figure 6:
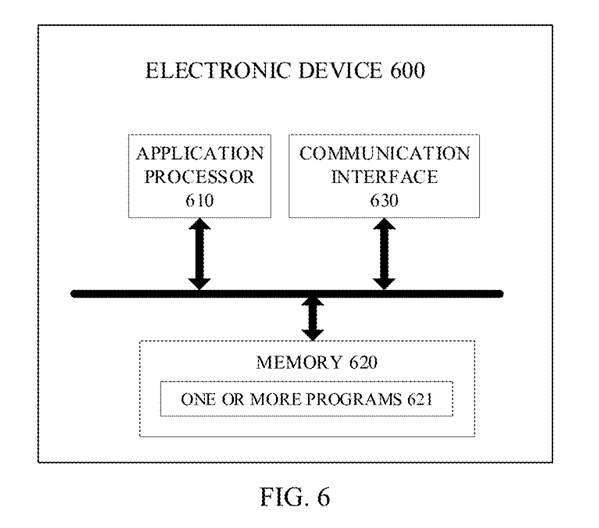
FIG. 6 is a schematic structural diagram illustrating an electronic device according to implementations.

In accordance with the implementations of FIG. 3, FIG. 4, and FIG. 5, FIG. 6 is a schematic structural diagram illustrating an electronic device 600 according to implementations. As illustrated in FIG. 6, the electronic device 600 includes an application processor (AP) 610, a memory 620, a communication interface 630, and one or more programs 621 stored in the memory 620. The one or more programs 621 are configured to be executed by the application processor 510 and include instructions configured to perform the following operations.

A Wi-Fi module is activated in response to detecting a request for screen-projection to a target screen-projection device. A target wireless network is searched for and accessed, where the target screen-projection device is connected to the target wireless network. Electromagnetic interference between the Wi-Fi module and a MIPI of a display of the electronic device is detected. In response to the detected electromagnetic interference, a first prompt message is output, the display is turned off, and screen-projection to the target screen-projection device is performed, where the first prompt message indicates that the electronic device is turning off the display and performing screen-projection to the target screen-projection device.

According to the implementations, in response to detecting the request for screen-projection to the target screen-projection device, the electronic device activates the Wi-Fi module. The electronic device searches for and accesses the target wireless network, where the target screen-projection device is connected to the target wireless network. The electronic device detects electromagnetic interference between the Wi-Fi module and the MIPI of the display of the electronic device. In response to the detected electromagnetic interference, the electronic device outputs the first prompt message, turns off the display, and performs screen-projection to the target screen-projection device, where the first prompt message is used to indicate that the electronic device is turning off the display and performing screen-projection to the target screen-projection device. As can be seen, in response to detecting the request for screen-projection and there is electromagnetic interference between the Wi-Fi module and the MIPI of the display, the electronic device turns off the display, and performs screen-projection in the background, thereby avoiding electromagnetic interference between the Wi-Fi module and the MIPI of the display which affects a success rate of screen-projection, and improving communication stability in a screen-projection scene.

As an implementation, in terms of detecting the electromagnetic interference between the Wi-Fi module and the MIPI of the electronic device, the one or more programs 621 include instructions configured to perform following operations. At least one detection value of a first frequency and a detection value of a second frequency are obtained, where the first frequency is a communication frequency of the Wi-Fi module and the second frequency is an operating frequency of the MIPI. In response to the detected electromagnetic interference between the Wi-Fi module and the MIPI of the electronic device is determined according to an interference channel list, where the interference channel list contains information of interference of different operating frequencies of the MIPI to different channels.

As an implementation, the one or more programs 621 further include instructions configured to perform following operations after the first prompt message is output and the display is turned off in response to the detected electromagnetic interference. An operating frequency set of at least one channel of a target router and an available frequency range or available frequency of the second frequency are obtained. A strategy for electromagnetic interference control is determined according to the interference channel list, the operating frequency set of at least one channel of the target router, and any one of the available frequency range or available frequency of the second frequency. When the display is activated, interference control is performed according to the strategy for electromagnetic interference control to reduce or avoid electromagnetic interference between the MIPI and the Wi-Fi module of the electronic device.

As an implementation, in terms of the strategy for electromagnetic interference control, the one or more programs 621 include instructions configured to perform: determining a target frequency of the second frequency according to the interference channel list, where the target frequency is a frequency of the MIPI that causes the minimum interference to the operating frequency of the channel of the target router; adjusting the frequency of the MIPI to the target frequency.

As an implementation, in terms of the strategy for electromagnetic interference control, the one or more programs 621 include instructions configured to perform: determining a target channel according to the interference channel list, where the target channel is one of at least one wireless channel of the target router that causes the minimum interference to the operating frequency of the MIPI before the display is turned off; performing channel switching according to the target channel.

As an implementation, in terms of the strategy for electromagnetic interference control, the one or more programs 621 include instructions configured to perform: determining a target channel and a target frequency of the second frequency according to the interference channel list, where the target channel and the target frequency are a wireless channel and a frequency of the MIPI that correspond to the minimum interference in the interference channel list; adjusting the frequency of the MIPI to the target frequency and performing channel switching according to the target channel.

As an implementation, in terms of performing screen-projection to the target screen-projection device, the one or more programs 621 include instructions configured to perform following operations. A source address of data information is sent to the target screen-projection device, where the source address of data information is used for the target screen-projection device to establish a connection with a server at the source address.

As an implementation, the one or more programs 621 further include instructions configured to perform following operations after the first prompt message is output and the display is turned off in response to the detected electromagnetic interference. A second prompt message is output when screen-projection of the electronic device is finished, where the second prompt message indicates that screen-projection is finished.

The foregoing solution of the implementations of the disclosure is mainly described from the viewpoint of execution process of the method. It can be understood that, in order to implement the above functions, the mobile terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 7:
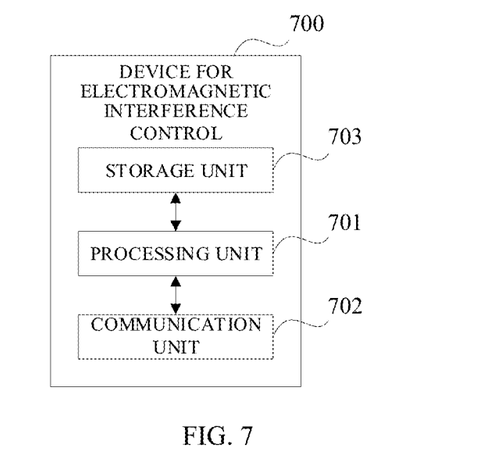
FIG. 7 is a block diagram illustrating functional units of a device for electromagnetic interference control according to implementations.

FIG. 7 is a block diagram illustrating functional units of a device 700 for electromagnetic interference control according to implementations. The device 700 for electromagnetic interference control is applicable to an electronic device. The electronic device includes a processing unit 701 and a communication unit 702.

The processing unit 701 is configured to: activate a Wi-Fi module in response to detecting a request for screen-projection to a target screen-projection device; search for and access a target wireless network, the target screen-projection device being connected to the target wireless network; detect electromagnetic interference between the Wi-Fi module and a MIPI of a display of the electronic device; output a first prompt message, turn off the display, and perform screen-projection to the target screen-projection device, in response to the detected electromagnetic interference, where the first prompt message indicates that the electronic device is turning off the display and performing screen-projection to the target screen-projection device.

The device 700 for electromagnetic interference control may also include a storage unit 703 for storing program codes and data of the electronic device. The processing unit 701 may be a processor, the communication unit 702 may be a touch screen or a transceiver, and the storage unit 703 may be a memory.

According to the implementations, in response to detecting the request for screen-projection to the target screen-projection device, the electronic device activates the Wi-Fi module. The electronic device searches for and accesses the target wireless network, where the target screen-projection device is connected to the target wireless network. The electronic device detects electromagnetic interference between the Wi-Fi module and the MIPI of the display of the electronic device. In response to the detected electromagnetic interference, the electronic device outputs the first prompt message, turns off the display, and performs screen-projection to the target screen-projection device, where the first prompt message is used to indicate that the electronic device is turning off the display and performing screen-projection to the target screen-projection device. As can be seen, in response to detecting the request for screen-projection and there is electromagnetic interference between the Wi-Fi module and the MIPI of the display, the electronic device turns off the display, and performs screen-projection in the background, thereby avoiding electromagnetic interference between the Wi-Fi module and the MIPI of the display which affects a success rate of screen-projection, and improving communication stability in a screen-projection scene.

As an implementation, the processing unit 701 configured to detect the electromagnetic interference between the Wi-Fi module and the MIPI of the electronic device is configured to: obtain at least one detection value of a first frequency and a detection value of a second frequency, where the first frequency is a communication frequency of the Wi-Fi module and the second frequency is an operating frequency of the MIPI; determine the electromagnetic interference between the Wi-Fi module and the MIPI of the electronic device according to an interference channel list, where the interference channel list contains information of interference of different operating frequencies of the MIPI to different channels.

As an implementation, the processing unit 701 is further configured to: after outputting the first prompt message and turning off the display in response to the detected electromagnetic interference: obtain an operating frequency set of at least one channel of a Wi-Fi module and an available frequency range or available frequency of the second frequency; determine a strategy for electromagnetic interference control according to the interference channel list, the operating frequency set of at least one channel of the target router, and any one of the available frequency range or available frequency of the second frequency; perform interference control according to the strategy for electromagnetic interference control when the display is activated, to reduce or avoid electromagnetic interference between the MIPI and the Wi-Fi module of the electronic device.

As an implementation, in terms of the strategy for electromagnetic interference control, the processing unit 701 is further configured to: determine a target frequency of the second frequency according to the interference channel list, where the target frequency is a frequency of the MIPI that causes the minimum interference to the operating frequency of the channel of the target router; adjust the frequency of the MIPI to the target frequency.

As an implementation, in terms of the strategy for electromagnetic interference control, the processing unit 701 is further configured to: determine a target channel according to the interference channel list, where the target channel is one of at least one wireless channel of the target router that causes the minimum interference to the operating frequency of the MIPI before the display is turned off; perform channel switching according to the target channel.

As an implementation, in terms of the strategy for electromagnetic interference control, the processing unit 701 is further configured to: determine a target channel and a target frequency of the second frequency according to the interference channel list, where the target channel and the target frequency are a wireless channel and a frequency of the MIPI that correspond to the minimum interference in the interference channel list; adjust the frequency of the MIPI to the target frequency and perform channel switching according to the target channel.

As an implementation, the processing unit 701 configured to perform screen-projection to the target screen-projection device is configured to: send a source address of data information to the target screen-projection device, where the source address of data information is used for the target screen-projection device to establish a connection with a server at the source address.

As an implementation, the processing unit 701 is further configured to: after outputting the first prompt message, turning off the display, and performing screen-projection to the target screen-projection device, in response to the detected electromagnetic interference: output a second prompt message when screen-projection of the electronic device is finished, where the second prompt message indicates that screen-projection is finished.

Implementations further provide a non-transitory computer storage medium. The computer storage medium is configured to store a computer program for electronic data interchange. The computer program causes a computer to execute all or part of operations of the method of the above. The computer includes an electronic device.

Implementations further provide a computer program product. The computer program product includes a non-transitory computer-readable storage medium storing a computer program. The computer program is operable to cause the computer execute all or part of operations of the method of the above. The computer program product may be a software installation package. The computer includes an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable storage, which may include a flash memory, a ROM, a RAM, disk or CD, and so on.

The implementations of this application are described in detail above. Some examples are used herein to illustrate the principle and implementation manners of this application. The description of the above implementations is only used to help understand the method and core idea of this application. Meanwhile, for those of ordinary skill in the art, according to the idea of this application, there will be changes in the implementation manner and the application scope. In summary, contents of this specification should not be construed as a limitation on this application.

What is claimed is:

1. A method for electromagnetic interference control, for an electronic device and comprising:
    activating a wireless fidelity (Wi-Fi) module of the electronic device in response to detecting a request for screen-projection to a target screen-projection device;
    searching for and accessing a target wireless network, the target screen-projection device being connected to the target wireless network, detecting electromagnetic interference between the Wi-Fi module of the electronic device and a mobile industry processor interface (MIPI) of a display of the electronic device; and outputting a first prompt message, turning off the display, and performing screen-projection to the target screen-projection device, in response to the detected electromagnetic interference, wherein the first prompt message indicates that the electronic device is turning off the display and performing screen-projection to the target screen-projection device.

2. The method of claim 1, wherein detecting the electromagnetic interference between the Wi-Fi module and the MIPI of the display of the electronic device comprises:

obtaining at least one detection value of a first frequency and a detection value of a second frequency, wherein the first frequency is a communication frequency of the Wi-Fi module and the second frequency is an operating frequency of the MIPI; and determining the electromagnetic interference between the Wi-Fi module and the MIPI of the electronic device according to an interference channel list, wherein the interference channel list contains information of interference of different operating frequencies of the MIPI to different channels.

3. The method of claim 2, further comprising:

after turning off the display in response to the detected electromagnetic interference:

obtaining an operating frequency set of at least one channel of a target router and an available frequency range or available frequency of the second frequency;

determining a strategy for electromagnetic interference control according to the interference channel list, the operating frequency set of at least one channel of the target router, and any one of the available frequency range or available frequency of the second frequency; and performing interference control according to the strategy for electromagnetic interference control when the display is activated, to reduce or avoid electromagnetic interference between the MIPI and the Wi-Fi module of the electronic device.

4. The method of claim 3, wherein the interference channel list contains interference values and interference levels of interference of different operating frequencies of the MIPI to different Wi-Fi channels.

5. The method of claim 3, wherein the strategy for electromagnetic interference control comprises:

determining a target frequency of the second frequency according to the interference channel list, wherein the target frequency is a frequency of the MIPI that causes minimum interference to the operating frequency of the channel of the target router; and adjusting the frequency of the MIPI to the target frequency.

6. The method of claim 3, wherein the strategy for electromagnetic interference control comprises:

determining a target channel according to the interference channel list, wherein the target channel is one of at least one wireless channel of the target router that causes minimum interference to the operating frequency of the MIPI before the display is turned off; and performing channel switching according to the target channel.

7. The method of claim 3, wherein the strategy for electromagnetic interference control comprises:

determining a target channel and a target frequency of the second frequency according to the interference channel list, wherein the target channel and the target frequency are a wireless channel and a frequency of the MIPI that correspond to minimum interference in the interference channel list; and adjusting the frequency of the MIPI to the target frequency and performing channel switching according to the target channel.

8. The method of claim 1, wherein performing screen-projection to the target screen-projection device comprises:

sending a source address of data information to the target screen-projection device, wherein the source address of data information is used for the target screen-projection device to establish a connection with a server at the source address.

9. The method of claim 8, further comprising:

after turning off the display, and performing screen-projection to the target screen-projection device, in response to the detected electromagnetic interference:

outputting a second prompt message when the screen-projection of the electronic device is finished, wherein the second prompt message indicates that the screen-projection is finished.

10. An electronic device comprising a processor, a memory, a communication interface, and one or more programs stored in the memory, wherein the one or more programs are configured to be executed by the processor and comprise instructions configured to:

activate a wireless fidelity (Wi-Fi) module in response to detecting a request for screen-projection to a target screen-projection device;

search for and access a target wireless network, the target screen-projection device being connected to the target wireless network;

detect electromagnetic interference between the Wi-Fi module and a mobile industry processor interface (MIPI) of a display of the electronic device; and output a first prompt message, turn off the display, and perform screen-projection to the target screen-projection device, in response to the detected electromagnetic interference, wherein the first prompt message indicates that the electronic device is turning off the display and performing screen-projection to the target screen-projection device.

11. The electronic device of claim 10, wherein in terms of detecting whether electromagnetic interference between the Wi-Fi module and the MIPI of the electronic device, the one or more programs comprise instructions configured to:

obtain at least one detection value of a first frequency and a detection value of a second frequency, wherein the first frequency is a communication frequency of the Wi-Fi module and the second frequency is an operating frequency of the MIPI; and determine electromagnetic interference between the Wi-Fi module and the MIPI of the electronic device according to an interference channel list, wherein the interference channel list contains information of interference of different operating frequencies of the MIPI to different channels.

12. The electronic device of claim 11, wherein the one or more programs further comprise instructions configured to:

after outputting the first prompt message and turning off the display in response to the detected electromagnetic interference:

obtain an operating frequency set of at least one channel of a target router and an available frequency range or available frequency of the second frequency;

determine a strategy for electromagnetic interference control according to the interference channel list, the operating frequency set of at least one channel of the target router, and any one of the available frequency range or available frequency of the second frequency; and perform interference control according to the strategy for electromagnetic interference control when the display is activated, to reduce or avoid electromagnetic interference between the MIPI and the Wi-Fi module of the electronic device.

13. The electronic device of claim 12, wherein the strategy for electromagnetic interference control comprises:

determining a target frequency of the second frequency according to the interference channel list, wherein the target frequency is a frequency of the MIPI that causes minimum interference to the operating frequency of the channel of the target router; and adjusting the frequency of the MIPI to the target frequency.

14. The electronic device of claim 12, wherein the strategy for electromagnetic interference control comprises:

determining a target channel according to the interference channel list, wherein the target channel is one of at least one wireless channel of the target router that causes minimum interference to the operating frequency of the MIPI before the display is turned off; and performing channel switching according to the target channel.

15. The electronic device of claim 12, wherein the strategy for electromagnetic interference control comprises:

determining a target channel and a target frequency of the second frequency according to the interference channel list, wherein the target channel and the target frequency are a wireless channel and a frequency of the MIPI that correspond to minimum interference in the interference channel list; and adjusting the frequency of the MIPI to the target frequency and performing channel switching according to the target channel.

16. The electronic device of claim 10, wherein in terms of performing screen-projection to the target screen-projection device, the one or more programs comprise instructions configured to:

send a source address of data information to the target screen-projection device, wherein the source address of data information is used for the target screen-projection device to establish a connection with a server at the source address.

17. A non-transitory computer-readable storage medium storing a computer program for electronic data interchange, wherein the computer program causes a computer to perform:

activating a wireless fidelity (Wi-Fi) module of an electronic device in response to detecting a request for screen-projection to a target screen-projection device;

searching for and accessing a target wireless network, the target screen-projection device being connected to the target wireless network, detecting electromagnetic interference between the Wi-Fi module of an electronic device and a mobile industry processor interface (MIPI) of a display of the electronic device; and outputting a first prompt message, turning off the display, and performing screen-projection to the target screen-projection device, in response to the detected electromagnetic interference, wherein the first prompt message indicates that the electronic device is turning off the display and performing screen-projection to the target screen projection device.

18. The non-transitory computer-readable storage medium of claim 17, wherein the computer program further causes a computer to perform:

obtaining an operating frequency set of at least one channel of a target router and an available frequency range or available frequency of a second frequency;

determining a strategy for electromagnetic interference control according to an interference channel list, the operating frequency set of at least one channel of the target router, and any one of the available frequency range or available frequency of the second frequency; and performing interference control according to the strategy for electromagnetic interference control when the display is activated, to reduce or avoid electromagnetic interference between the MIPI and the Wi-Fi module of the electronic device.

* * * * *